(12) United States Patent
Behl et al.

(10) Patent No.: US 8,901,253 B2
(45) Date of Patent: Dec. 2, 2014

(54) POLYMER NETWORK WITH TRIPLE SHAPE EFFECT AND ASSOCIATED PROGRAMMING METHOD

(75) Inventors: Marc Behl, Berlin (DE); Andreas Lendlein, Berlin (DE); Yakai Feng, Tianjin (CN); Jorg Zotzmann, Berlin (DE)

(73) Assignee: Helmholtz-Zentrum Geesthacht Zentrum fur Material und Kustenforschung GmbH, Geesthacht (DE)

( * ) Notice: Subject to any disclaimer, the term of this patent is extended or adjusted under 35 U.S.C. 154(b) by 698 days.

(21) Appl. No.: 13/126,781

(22) PCT Filed: Oct. 29, 2009

(86) PCT No.: PCT/EP2009/064286
§ 371 (c)(1),
(2), (4) Date: Jul. 12, 2011

(87) PCT Pub. No.: WO2010/049486
PCT Pub. Date: May 6, 2010

(65) Prior Publication Data
US 2011/0259517 A1    Oct. 27, 2011

(30) Foreign Application Priority Data

Oct. 31, 2008    (DE) .......... 10 2008 055 870

(51) Int. Cl.

| | | |
|---|---|---|
| B32B 37/12 | (2006.01) | |
| B32B 37/14 | (2006.01) | |
| C08G 63/91 | (2006.01) | |
| C08G 63/08 | (2006.01) | |
| C08J 3/24 | (2006.01) | |
| C08G 18/42 | (2006.01) | |
| C08G 18/10 | (2006.01) | |
| C08L 101/12 | (2006.01) | |
| B29C 61/00 | (2006.01) | |
| B29C 61/06 | (2006.01) | |
| C08G 18/81 | (2006.01) | |

(52) U.S. Cl.
CPC .............. *B29C 61/003* (2013.01); *C08J 3/246* (2013.01); *C08G 18/4277* (2013.01); *C08G 18/4269* (2013.01); *C08G 2280/00* (2013.01); *C08J 2367/04* (2013.01); *C08J 3/243* (2013.01); *C08G 18/10* (2013.01); *C08G 63/08* (2013.01); *C08L 101/12* (2013.01); *B29C 61/0616* (2013.01); *C08G 18/8116* (2013.01); *C08G 2270/00* (2013.01)
USPC .......................................... 525/444; 528/354

(58) Field of Classification Search
CPC ........... C08G 18/4018; C08G 18/4277; C08G 18/4269; C08G 18/4854; C08G 18/8175; C08G 18/40; C08G 210/10; C08G 2280/00; B29C 61/003; C08L 101/00; G01K 5/483
USPC .......................... 525/444; 528/354; 156/108.2
See application file for complete search history.

(56) References Cited

U.S. PATENT DOCUMENTS

| | | | | |
|---|---|---|---|---|
| 6,388,043 B1 * | 5/2002 | Langer et al. | ............. | 528/80 |
| 2004/0024143 A1 * | 2/2004 | Lendlein et al. | ............. | 525/453 |
| 2007/0275020 A1 * | 11/2007 | Lendlein et al. | ............. | 424/401 |
| 2010/0028686 A1 | 2/2010 | Xie | | |

FOREIGN PATENT DOCUMENTS

| | | |
|---|---|---|
| EP | 1362872 | 11/2003 |
| EP | 2075273 | 7/2009 |
| WO | WO 99/42528 | 8/1999 |
| WO | WO 2008/019875 | 2/2008 |
| WO | WO 2009/095434 | 8/2009 |

OTHER PUBLICATIONS

I. Arvanitoyannis, A., et al., Novel star-shaped polylactide with glycerol using stannous octate or tetraphenyl tin as catalyst: Synthesis, characterization and study of their biodegradability, Vo. 36, No. 15 (1995) XP002567495.
International Search Report dated Apr. 20, 2010.

* cited by examiner

*Primary Examiner* — Randy Gulakowski
*Assistant Examiner* — Christopher M Rodd
(74) *Attorney, Agent, or Firm* — VLP Law Group LLP; Kent H. Cheng (57) ABSTRACT

The invention relates to a polymer network with triple-shape-memory effect and an associated programming method. The invention also relates to a method for producing layer systems made of shape-memory materials comprising the polymer network. The polymer network includes A) a first crystalline switching segment made of a star polymer; and
B) a second crystalline switching segment made of a linear polymer or a star polymer.

10 Claims, 4 Drawing Sheets

POLYMER NETWORK WITH TRIPLE SHAPE EFFECT AND ASSOCIATED PROGRAMMING METHOD

PRIORITY CLAIM

This is a U.S. national stage of application No. PCT/EP2009/064286, filed on Oct. 29, 2009. Priority is claimed on the following application: German Application No.: 102008055870.2 filed on Oct. 31, 2008, the content of which is incorporated here by reference.

The invention relates to a polymer network with triple-shape-memory effect and an associated programming method. The invention also relates to a method for producing layer systems made from polymer shape-memory materials.

BACKGROUND OF THE INVENTION

Unlike dual-shape-memory polymers which have been summarized in the literature and which can accomplish the network formation by both physical interactions as well as by covalent bonds, triple-shape-memory polymers have thus far been described only as networks based on covalent bonds [Bellin, I. et al., Polymer triple-shape materials, PNAS (2006), 103(48), p. 18043-18047]. Such triple-shape-memory polymer networks consist of at least one type of covalent cross-linking sites and at least two types of switching segments. In analogy to a dual-shape-memory polymer networks, triple-shape-memory polymer networks may contain, among others, segments of poly($\epsilon$-caprolactone), polyethers, polyether urethanes, polyimides, polyether imides, poly(meth)acrylate, polyurethane, polyvinyl compounds, polystyrenes, polyoxymethylene or poly(para-dioxanone). Introduction of hydrolysable groups, such as diglycolide, dilactide, polyanhydrides or polyorthoesters can produce biodegradable triple-shape-memory polymers [Lendlein, A. & Langer, R.: Biodegradable, elastic shape-memory polymers for potential biomedical applications. Science, 2002. 296 (5573): p. 1673-1676, Lendlein, A. & Kelch, S.: Degradable, Multifunctional Polymer Biomaterials with Shape-memory. Materials Science Forum, 2005. 492-493: p. 219-224].

Figure 1:
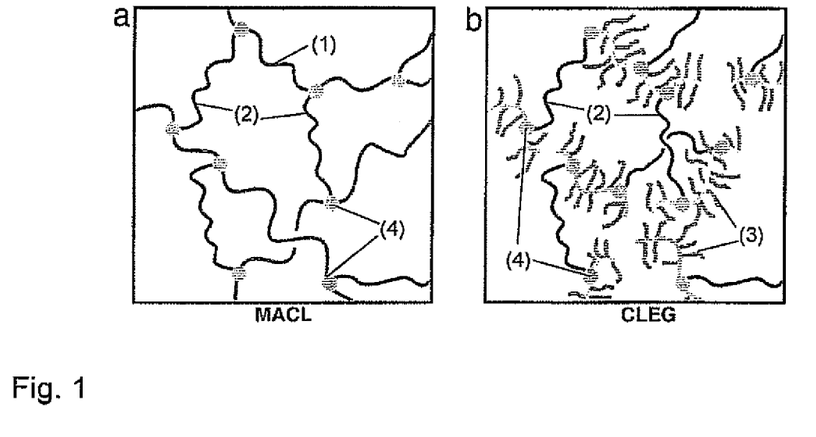
FIG. 1 conventional polymer network architectures, namely (a) a MACL network and (b) a CLEG network.

Polymer networks, which enable the triple-shape-memory effect, can be configured as AB-networks, where both chain segments contribute to the elasticity or as side chain networks, where the segments between the cross-linking sites predominantly contribute to the elasticity. The first may be realized, for example, by the polymerization of poly($\epsilon$-caprolactone)dimethacrylate with cyclohexylmethacrylate (MACL). A side chain network can be realized by the polymerization of poly($\epsilon$-caprolactone)dimethacrylate with polyethylene glycol monomethylether methacrylate (CLEG). Both network architectures are graphically illustrated in FIG. 1; (1) indicates here PCHMA segments; (2) PCL segments; (3) PEG side chains; and (4) cross-linking sites.

For programming purposes, segment of the test samples must be brought into a temporary form. The following exemplary methods may be used for programming:

Temporarily increasing the temperature above the switching temperature(s) $T_{switch}$ with subsequent deformation Temporarily introducing plasticizers, so that the ambient temperature is above $T_{switch}$, with a subsequent deformation and removal of the plasticizer.

Programming of a different segments of the component must here be performed separately for each segment of the component, whereby care has to be taken that the programming of a particular segment does not cancel the programming of another segment. The programming is done in dependence of the switching temperature. This means that in practice the segment with the highest $T_{switch}$ is programmed first, whereafter the temperature is sequentially lowered, followed by programming of additional segments. In addition, different programming methods can be used for individual segments.

For retrieving the two shape changes of the component, the component must be moved into the heat-transmitting medium, wherein the temperature of the medium is successively increased, until the first shape change occurs. The additional shape change of the component occurs only when the temperature of the medium is increased further.

The principle of the triple-shape-memory polymers (or triple-shape polymers) has already been described in detail. Known segments are here based, on one hand, on the combination of segments made of polyethylene glycol (PEG) and poly($\epsilon$-caprolactone) (PCL) and, on the other hand, on the combination of PCL and cyclohexyl methacrylate (CHMA). The switching temperatures for using the triple-shape-memory effect are in the first case at 40 and 70° C. and in the second case at 70 and 130° C. In both cases, the shape change of components made from different material classes can only be stimulated through heat conduction of the air and hence takes a long time (40 to 80 minutes). Water is a very good heat transfer medium, but is not available for either polymer system, because it causes in PEG/PCL system swelling of the network due to the hydrophilic characteristic of PEG. Crystalline PEG regions may also swell, thereby negating the physical cross-linking required for the triple-shape-memory effect. In the PCL/CHMA system, water cannot be heated to the required switching temperature of 130° C. under normal pressure. Several applications, for example in the medical field, require complex shape changes, in particular those which includes a sequential order of the shapes A→B→C, sometimes within very short time intervals. It may for example be necessary to reshape a "round" tube into an "oval" tube and then back into a "round" tube. Until now, none of the aforedescribed triple-shape-memory polymers can produce this deformation in an aqueous environment. The shape changes attainable so far are limited by the programmable shapes, a movement of the test sample is so far only feasible to the extent to which this shape change has previously been programmed. In particular, two-dimensional or three-dimensional movements are severely limited. An additional disadvantage of the conventional systems is their low elasticity, in particular below the switching temperature.

The conventional systems have therefore the following disadvantages:

Until now, the use of the one-way shape-memory effect allows only a one-time change of a shape by thermal stimulation. The change of the stimulation conditions, for example an additional increase of the temperature, has no effect on to the shape of a component, if $T_{perm}$ is not exceeded, which would cause melting of the component with thermoplastics.

With the introduction of the triple-shape-memory polymers, it becomes possible to realize all together three different shapes of the component. The successive stimulation of the individual shapes is attained by a temperature increase after suitable programming of the component. However, programming of known triple-shape-memory polymers is very demanding.

The material should provide high elasticity, i.e., high elongation at break, in particular greater than 400% at room temperature. However, known triple-shape-memory polymers have significantly lower elasticity.

Known triple-shape-memory polymers are sensitive to water, so that water is eliminated as a particularly effective heat transfer medium. The swelling properties and switching temperatures do not allow a shape change in water.

The aforementioned problems have so far not been solved, although the recently introduced concept of triple-shape-memory polymers has opened the possibility for sequential control of the thermally induced shape-memory effect. Neither a one-step programming of the triple-shape-memory effect at room temperature, nor a high elongation at break>400%, nor a variation of the trigger temperature through selection of the programming temperature have been realized to date with triple-shape-memory materials. It has also not been possible to date to make the triple-shape-memory effect reversible, renewed programming has so far been required after each shape recovery.

It is therefore an object of the invention to solve or at least alleviate one or more of the aforementioned problems.

SUMMARY OF THE INVENTION

A first aspect of the invention is to provide a polymer network with triple-shape-memory effect. The polymer network includes
A) a first crystalline switching segment made of a star polymer; and
B) a second crystalline switching segment made of a linear polymer or a star polymer.

In the present context, star polymers are defined as polymers with at least three linear side arms, connected to a central core. In other words, the term star polymer relates to polymers with a primary chain and at least one long chain branch or polymers with several long chain branches which are attached at a common branch point on the primary chain. Preferably, these are polymers with a total of three or four side arms.

The two crystalline switching segments are covalently bonded with each other in the polymer network. The triple-shape-memory materials according to the invention are therefore composed of at least two different macro-monomers. At least one macro-monomer must hereby be a star-shaped telechelic molecule, which has at least three side arms, each having a reactive end group. The second macro-monomer must be linear with at least two reactive end groups, or the two macro-monomers are star-shaped telechelic molecules. In addition, both phases must be crystalline. The triple-shape-memory material can be a multi-phase system, in which at least two phases are crystalline.

Preferably, the first crystalline switching segment is comprised of a star polymer based on poly(pentadecalactone) (PPDL segment). Independently, but more particularly in combination, the second crystalline switching segment may be comprised of a star polymer based on poly(ε-caprolactone) (PCL segment) or polytetrahydrofurane (PTHF segment).

In addition, in particular in combination with the aforementioned particular embodiments, polymer networks are preferred where the melting points of the two crystalline switching segments are in a range of 0° C. to 100° C., in particular in a range from room temperature to 100° C. Preferably, the melting points of the two crystalline switching segments are separated by at least 15° C., in particular by at least 20° C.

According to another preferred embodiment, the first crystalline switching segment and/or the second crystalline switching segment of the polymer network has an average molecular weight in a range from 500 to 50,000 g/mole, in particular in a range from 1000 to 5000 g/mole. These segments have a molecular weight in the aforementioned range particularly in polymer networks with PPDL, PCL or PTHF segments.

Preferably, the fraction of individual switching segments, in particular of the PPDL segments, as part of the total weight of all crystalline switching segments is 20 to 80 wt.-%. In particular, the fraction of the PPDL segments as part of the total weight of a polymer network with PPDL segments and PCL segments is 20 to 80 wt.-%.

The triple-shape material may be produced, for example, by synthesizing as a first intermediate product a star polymer based on poly(pentadecalactone) with functional end (terminal) groups arranged on the side arms (this preliminary stage can also be referred to as a nonlinear telechelic molecule with three or more arms). An important first intermediate product in the synthesis of the triple-shape-memory material is therefore in particular a star polymer based on poly(pentadecalactone) with a respective terminal functional group on each side arm. This star polymer based on poly(pentadecalactone) has preferably an average molecular weight in a range from 500 to 50,000 g/mole, in particular in a range from 1000 to 5000 g/mole. Basically, three methods are available for synthesizing the star polymers: (i) connecting prefabricated arms with a core, (ii) polymerization from a multi-functional initiator, and (iii) a combination of these two methods.

As a second intermediate product a linear polymer or a star polymer, for example based on poly(ε-caprolactone) or polytetrahydrofurane with likewise functional end groups arranged on the side arms, is used. This second polymer intermediate product has preferably an average molecular weight in a range from 500 to 50,000 g/mole, in particular in a range from 1000 to 25,000 g/mole.

The two polymer intermediate products are covalently linked via their terminal functional groups. The linkage can be either direct or via suitable coupling reagents (for example diisocyanates). More particularly, the linkage can also occur by a polyaddition reaction or through photopolymerization. Preferably, the functional group is a hydroxyl, acrylate or methacrylate group.

The invention offers, inter alia, the following advantages:
a. PPDL-based networks have a triple-shape-memory functionality, which can be programmed at room temperature through cold stretching.
b. By using water as heat transfer medium, triple-shape-memory polymers can attain the temperatures required for shape changes significantly more quickly than by using air as heat transfer medium.
c. By selecting a second switching segment which has a transition temperature below the boiling temperature of water and is insoluble in water, heat can now be transferred using water.
d. The permanent shape in the polymer networks according to the invention is formed already during the polymerization. The network formation can here occur in particular through polymerization of methacryl groups as well as through polycondensation of hydroxyl groups with diisocyanates. The polymerization can be either thermally initiated or photochemical. In particular, the photochemical polymerization enables bodies with complex shapes, because it is not performed from solution.
e. PPDL-based networks, unlike the aforedescribed triple-shape-memory networks, have significantly greater elasticity and are also not soluble/swellable in water.
f. Elongation fixation ratios and elongation recovery ratios have values above 90%.
g. Layers of the polymer networks can be differently programmed in one dimension and are capable of realizing many three-dimensional movements after being glued together covalently as a multilayer system.

h. The networks show under constant tension a thermally induced reversible triple-shape-memory effect. High elongations of 100% and more can be attained. This triple-shape-memory effect can be reproduced without reprogramming as long as the sample is under tension.

By using star-shaped PPDL oligomers, a network architecture is formed which due to the selection of the switching temperature has superior mechanical properties, such as elasticity, cold stretching ability and the selection of the trigger temperature, compared to the conventional systems. PPDL has always been used in conventional shape-memory networks as a hard segment. This is the first use of PPDL segments as switching segment. It is also the first triple-shape-memory network architecture in which two crystalline primary chain segments are used which contribute to the overall elasticity of the network. The structure of multilayer systems enables a significant broadening of possible shape changes, thus significantly enlarging the spectrum of applications for the polymers.

Components produced from a uniform triple-shape-memory polymer can be intentionally switched with a time offset by increasing the ambient temperature in an aqueous environment. With the one-step programming of triple-shape-memory networks with a crystalline and a glassy segment, recovery of the programming after a certain time has been observed. Triple-shape-memory networks with two crystalline segments, wherein both crystalline phases contribute to the total elasticity, do not exhibit this undesirable recovery.

By using triple-shape-memory polymers with several switching segments, two consecutive shape transitions can be realized in a polymer.

Additional aspects of the invention are:

A) New approaches for network synthesis
1. The networks are built from two different star-shaped telechelic molecules, or
2. The networks are built from a star-shaped telechelic molecule and a linear telechelic molecule.

B) PPDL segments are used for the networks
1. PPDL is insoluble in water
2. PPDL has a melting temperature below 100° C.

C) PPDL-based shape-memory systems have high elasticity
1. PPDL-based shape-memory systems allow programming by cold stretching
2. PPDL-based shape-memory systems allow a noticeable increase in elongation when crystallizing under tension D) PCL and PPDL segments are covalently cross-linked
1. The network architecture allows the creation of a temperature shape-memory effect over a wide temperature range (room temperature to $T_{m,PPDL}$).

The polymer network based on star-shaped segments of poly(pentadecadolactone) (PPDL) can perform several shape change steps.

These are characterized by the following aspects
(1) High elasticity at room temperature (RT)
(2) The triple-shape-memory effect can be programmed at ambient temperature ($T<T_{m,PPDL}$) by cold stretching
(3) Programming can be performed as one-step programming.

Combinations are possible which allow a temperature shape-memory effect for one of the two switching faces. A multilayer architecture of sample bodies allows complex three-dimensional shape changes. Combinations are also possible which show a reversible triple-shape-memory effect after pre-stretching under constant tension.

According to another aspect of the invention, a method is provided for programming a polymer network with triple-shape-memory effect of the aforedescribed composition. The programming method includes the step of:

Programming of at least two different shapes of the polymer network with
a) A two-step method;
b) A one-step method;
c) Cold stretching;
d) A combination of heating and cold stretching; or
e) Preconditioning by stretching.

In particular, programming can be performed according to the two-step method, wherein the polymer network is heated to $T_{high}$ above the two melting temperatures $T_{m,1}$ and $T_{m,2}$ of the crystalline switching segments ($T_{m,1}<T_{m,2}$), deformed, cooled to a temperature below $T_{m,2}$, deformed again, and then cooled to a temperature $T_{m,1}$.

Programming can also be performed according to the one-step method, wherein the polymer network is heated to $T_{high}$ above the two melting temperatures $T_{m,1}$ and $T_{m,2}$ of the crystalline switching segments ($T_{m,1}<T_{m,2}$), deformed and then cooled to a temperature below $T_{m,1}$. The recovery occurs during heating to $T_{high}$. First, a recovery occurs at $T_{sw,1}$, and then upon further heating at $T_{sw,2}$.

Programming can also be performed by cold stretching, wherein the polymer network is deformed at a temperature $T_{low}$ below the two melting temperatures $T_{m,1}$ and $T_{m,2}$ of the crystalline switching segments ($T_{low}<<T_{m,1}<T_{m,2}$). The recovery occurs during heating to $T_{high}$. First, a recovery occurs at $T_{sw,1}$ and then upon further heating at $T_{sw,2}$.

Programming can also be performed by a combination of heating and cold stretching, wherein the polymer network is deformed at a temperature $T_{mid}$ which is between the two melting temperatures $T_{m,1}$ and $T_{m,2}$ of the crystalline switching segments ($T_{m,1}<T_{mid}<T_{m,2}$). The recovery occurs during heating to $T_{high}$. First, a recovery occurs at $T_{sw,1}$, and thereafter upon further heating at $T_{sw,2}$.

Programming can also be performed with preconditioning by stretching at $T_{high}$. If the tension is kept constant even after stretching, then two shapes are stepwise attained by expansion when cooling to $T_{low}$, which are characterized by the two crystallization temperatures $T_{c,1}$ and $T_{c,2}$ ($T_{high}>T_{c,1}>T_{c,2}>T_{low}$), allowing reversible switching between three shapes. The extent of stretching hereby determines the deformation during cooling. The recovery occurs during heating to $T_{high}$ under constant tension. Initially, there is a recovery at $T_{sw,1}$ and upon further heating at $T_{sw,2}$. Switching between the shapes by cooling and heating can be arbitrarily repeated under constant tension, without requiring an additional programming step.

The recovery can take place under tension or by heating without tension across both $T_{sw}$. In particular, this can take place in water. Another aspect of the invention therefore relates to a method for recovering a programmed polymer network with triple-shape-memory effect, which includes step of thermal treatment of the programmed polymer network in water as thermal medium.

By selecting the programming temperature, the switching temperature of a shape-memory transition in the melting region of the two crystalline phases can be arbitrarily set.

Preferably, several layers of the polymer networks are joined with one another. The layers can be programmed identically or may have different magnitude, direction or programming temperature. Accordingly, tension gradients of different magnitude and direction can thus be generated in the multilayer material at different $T_{switch}$, which can result in complex shape changes.

If thin layers of the triple-shape-memory polymer, which have been subjected to different programming with respect to magnitude or direction, are covalently glued together, then this multilayer test sample can perform highly complex movements when the shape-memory effect is activated.

For realizing complex three-dimensional shape changes, only one-dimensional programming steps are required for the polymer layers which are then joined according to a calculated architecture. In this way, shapes can be attained which are difficult or impossible when programmed on bulk test samples. The attainable shapes are further augmented by using triple-shape-memory materials.

If tension is maintained in one or several layers that have been glued together from previously programmed layers, then the complex three-dimensional shape changes are completely or partially reversible.

Another aspect of the invention therefore relates to a method for producing layer systems from polymer shape-memory materials with the steps:
a) Providing at least two layers made of polymer shape-memory materials; and
b) Producing a layer system from the at least two layers by reactive gluing, wherein the two layers differ with respect to their programming, shape or composition.

The layers can be provided in planar form or with a three-dimensional profile. The layers can have a different layer thickness. The layers may also consist of a polymer matrix with integrated shape-memory polymer fibers. The layers can also have different degrees of programming, in particular degrees of stretching, and/or a different programming orientation. Lastly, the layers can be programmed mono-directionally or multi-directionally.

Other preferred embodiments of the invention are recited as additional features in the dependent claims.

BRIEF DESCRIPTION OF THE DRAWINGS

Exemplary embodiments of the invention will now be described with reference to the appended drawings. These show in.

The synthesis of the hydroxy-telechelic star polymers with PCL- or PPDL-side arms occurs through ring opening polymerization of ε-caprolactone or pentadecadolactone with tri- or tetra-functional initiators. The synthesis can occur according to the following description: Arvanitoyannis, I., et al.: Novel Star-Shaped Polylactide with Glycerol Using Stannous Octoate or Tetraphenyl Tin as Catalyst 1. Synthesis, Characterization and Study of Their Biodegradability, Polymer, 1995, 36(15), p. 2947-2956. However, in contrast to this reference, the ring opening polymerization of PPDL was performed in 14 to 21 days. Hydroxy-telechelic star polymers with PTHF side arms can also be synthesized in an analogous manner.

Figure 2A:
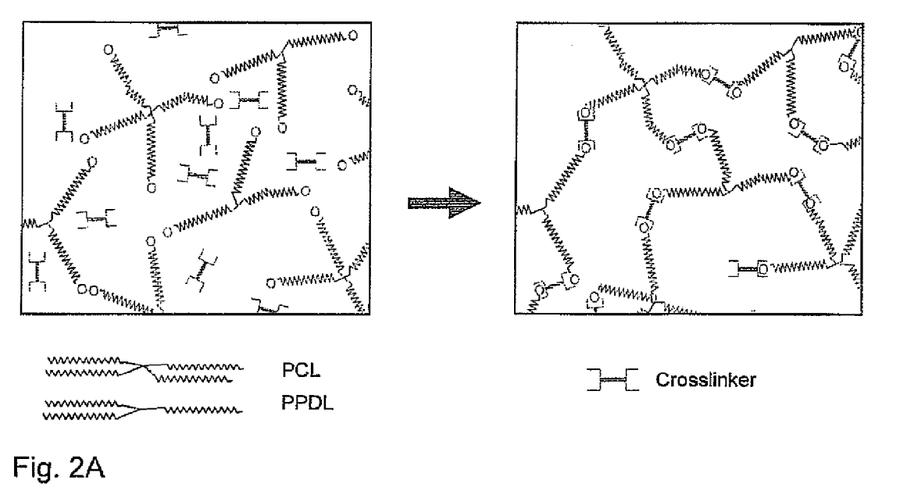
FIG. 2A a network architecture of a system according to the invention and its representation according to a first embodiment.
Figure 2B:
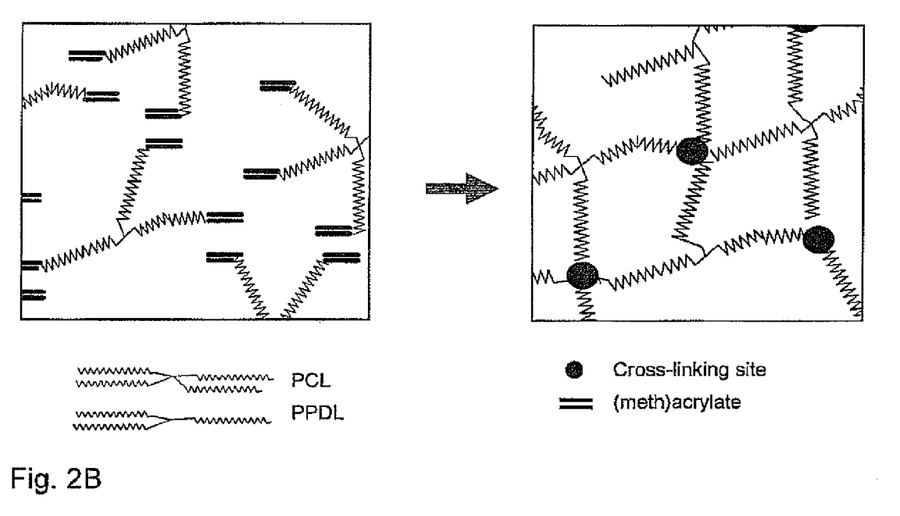
FIG. 2B a network architecture of a system according to the invention and its representation according to a second embodiment.

Examples for structures of polymer networks made of star-shaped telechelic molecules are illustrated in FIGS. 2A and 2B.

Synthesis of Hydroxy-Telechelic Oligo(ε-Caprolactone) PCL(x)-OH 97 ml ε-caprolactone, 0.68 g pentaerythrite and 280 mg dibutyltinoxide (DBTO) were reacted while stirring in a Schlenk flask in hydrogen atmosphere at 130° C. After a polymerization time of 7 h the reaction mixture is cooled to room temperature. The oligomers are dissolved in an approximately sixfold volume excess of dichloromethane. The reaction product is precipitated by slowly dripping the solution into an approximately tenfold volume excess of hexane fraction under strong stirring. The precipitate is washed with hexane fraction and dried at 25° C. in vacuum (approximately 1 mbar) until attaining constant weight. The molar mass and functional groups as well as the thermal properties were analyzed by determining the OH-number, GPC, $^1$H-NMR and DSC. The OH-number determination yielded $M_n$=22,700 g mole$^{-1}$. DSC measurements gave a melting temperature of 54.5° C., ΔH 76.8 J*g$^{-1}$. The obtained oligo(ε-caprolactone) with $M_n$ of about 20,000 g/mol will subsequently be referred to as PCL(20)-OH.

The synthesis of the hydroxy-telechelic oligo(ε-caprolactone)s PCL(4)-OH with $M_n$ 4000 g·mole$^{-1}$ or the hydroxy-telechelic oligo(ε-caprolactone)s PCL(8)-OH with $M_n$ 8000 g·mole$^{-1}$ took place via ring opening polymerization of ε-caprolactone similar to PCL(20)-OH. PCL(8)-OH is also commercially available under the label CAPA4801.

Synthesis of Hydroxyl-Telechelic Oligo(Pentadecadolactone) PPDL(y)-OH 112.5 g pentadecadolactone, 3.375 g 1,1,1-tris(hydroxymethyl)ethane (optionally also other tri- or tetra-functional initiators) and DBTO 105 mg were reacted while stirring in a Schlenk flask in a nitrogen atmosphere at 130° C. After a polymerization time of 7 h the reaction mixture is cooled to room temperature. The oligomers are dissolved in an approximately sixfold volume excess of dichloromethane. The reaction product is precipitated by slowly dripping the solution into an approximately tenfold volume excess of hexane fraction under strong stirring. The precipitate is washed with hexane fraction and dried at 50° C. in vacuum (approximately 1 mbar) until attaining constant weight.

The molar mass and functional groups as well as the thermal properties were analyzed by determining the OH-number, GPC, $^1$H-NMR and DSC. The OH-number determination yielded $M_n$=4000 g mole$^{-1}$. DSC measurements detected two melting temperatures of 49.8° C. and 84.8° C., ΔH 109.5 J·g$^{-1}$. The obtained oligo(pentadecadolactone) with $M_n$ of about 4000 g/mol will subsequently be referred to as PPDL (4)-OH.

The synthesis of the hydroxy-telechelic oligo(pentadecadolactone)s PPDL(3)-OH with $M_n$ 3000 g·mole$^{-1}$ or of the hydroxy-telechelic oligo(pentadecadolactone)s PPDL(2)-OH with $M_n$ 2000 g·mole$^{-1}$ was performed similar to the synthesis of PPDL(4)-OH.

Synthesis of Oligo(ε-Caprolactone)Tetramethacrylate PCL (x)-IEMA 50.0 g PCL(20)-OH, 1.6 ml IEMA and 6.5 μL dibutyltin (IV)dilaurate were dissolved in 250 ml dichloromethane under argon and stirred at room temperature for 5 days. The reaction product is precipitated by slowly dripping the solution into an approximately tenfold volume excess of hexane fraction under strong stirring. The precipitate is washed with hexane fraction and dried at 25° C. in vacuum (approximately 1 mbar) until attaining constant weight. $^1$H-NMR showed that the OH-groups in PCL(20)-OH have completely reacted with IEMA. The obtained oligo(ε-caprolactone)tetramethacrylate will subsequently be referred to as PCL(20)-IEMA.

The synthesis of the oligo(ε-caprolactone)tetramethacrylate PCL(4)-IEMA with $M_n$ 4000 g·mole$^{-1}$ and of the oligo (ε-caprolactone)tetramethacrylates PCL(8)-IEMA with $M_n$ 8000 g·mole$^{-1}$ was performed similar to PCL(20)-IEMA.

Synthesis Oligo(Pentadecadolactone)Trimethacrylate PPDL(y)-IEMA 50.0 g PPDL(4)-OH, 6.1 ml IEMA and 25.4 μL dibutyltin (IV)dilaurate were dissolved in 250 ml dichloromethane under argon and stirred at room temperature for 5 days. The reaction product is precipitated by slowly dripping the solution into an approximately tenfold volume excess of hexane fraction under strong stirring. The precipitate is washed with hexane fraction and dried at 25° C. in vacuum (approximately 1 mbar) until attaining constant weight. It was demonstrated with $^1$H-NMR that the OH-groups in PPDL(4)-OH have completely reacted with IEMA. The obtained oligo(pentadecadolactone)trimethacrylate will subsequently be referred to as PPDL(4)-IEMA.

Synthesis of the Networks According to the Polycondensation Method A)

The produced star polymers PCL(x)-OH and PPDL(y)-OH were dissolved in dichloromethane with a suitable mixing ratio. 2,2,4- and 2,4,4-trimethylhexane-1,6-diisocyanate (TMDI) is added as cross-linker. Mixtures with 25-75 wt.-% PPDL(y)-OH have proven to be suitable mixing ratios for triple-shape-memory polymers.

The hydroxy-telechelic oligomers are dissolved with an approximately tenfold excess mass of dichloromethane under nitrogen. Diisocyanate is added to the solution while stirring. The quantity of diisocyanate corresponds here to a molar ratio of the isocyanate to hydroxyl groups of 1.05 to 1.00. The calculation in Table 1 is based on the average value of the molar mass of the hydroxyl functionality of the polymer educts determined by $^1$H-NMR spectroscopy, for example of PPDL(4)-OH or PCL(20)-OH. The reaction mixture was stirred for five minutes at room temperature and filled into PTFE trays. Approximately 20 ml of the solution are introduced when using trays with an inside diameter of about 100 mm. A continuous nitrogen flow is passed over the solutions for 24 h at 60° C. so as to carefully evaporate the solvent during the film formation. Thereafter, the films are heated under vacuum (about 100 mbar) for 4 days to 80° C. The raw products of the poly-addition reactions are, unless otherwise stated, swollen in chloroform, thus determining the gel content and the degree of swelling, and dried at 80° C. in vacuum (1 mbar) until attaining constant weight. The weights of the oligomers and the diisocyanate and the gel content of the networks are listed in Table 1.

TABLE 1

Approaches for producing the networks from PCL(4)-OH, PCL(8)-OH, PCL(20)-OH, PPDL(2)-OH, PPDL(3)-OH, PPDL(4)-OH and TMDI according to the polycondensation method A) (indicated by the prefix T); network designation: PPDL(x)-PCL(y,z) are polymer networks made from the following star-shaped pre-polymers: 3-arm PPDL with Mn about x · 1000 g/mole and 4-arm PCL with $M_n$ about y · 1000 g/mole and a fraction of z mass-%;

| Designation | PPDL(y)-OH (g) | PCL(20)-OH (g) | PCL(8)-OH (g) | PCL(4)-OH (g) | TMDI (ml) | $\mu_{PPDL}$ (wt.-%) | Content (wt.-%) | Degree of swelling in chloroform (wt.-%) |
|---|---|---|---|---|---|---|---|---|
| T-PPDL(4) | 1.50 | — | — | — | 0.070 | 100 | 91 | 1420 |
| T-PPDL(4)-PCL(20, 75) | 0.75 | 2.25 | — | — | 0.106 | 25 | 85 | 2220 |
| T-PPDL(4)-PCL(20, 60) | 1.2 | 1.8 | — | — | 0.113 | 40 | 85 | 1980 |
| T-PPDL(4)-PCL(20, 50) | 1.5 | 1.5 | — | — | 0.118 | 50 | 88 | 1750 |
| T-PPDL(4)-PCL(20, 40) | 1.8 | 1.2 | — | — | 0.122 | 60 | 85 | 1960 |
| T-PPDL(4)-PCL(20, 25) | 2.25 | 0.75 | — | — | 0.141 | 75 | 92 | 1440 |
| T-PPDL(4)-PCL(8, 75) | 0.75 | — | 2.25 | — | 0.148 | 25 | 98 | 830 |
| T-PPDL(4)-PCL(8, 60) | 1.2 | — | 1.8 | — | 0.146 | 40 | 97 | 970 |
| T-PPDL(4)-PCL(8, 50) | 1.5 | — | 1.5 | — | 0.145 | 50 | 95 | 1240 |
| T-PPDL(4)-PCL(8, 40) | 1.8 | — | 1.2 | — | 0.144 | 60 | 92 | 1820 |
| T-PPDL(4)-PCL(8, 25) | 2.25 | — | 0.75 | — | 0.143 | 75 | 92 | 1310 |
| T-PPDL(4)-PCL(4, 75) | 0.75 | — | — | 2.25 | 0.26 | 25 | 97 | 1100 |
| T-PPDL(4)-PCL(4, 60) | 1.2 | — | — | 1.8 | 0.236 | 40 | 93 | 1350 |
| T-PPDL(4)-PCL(4, 50) | 1.5 | — | — | 1.5 | 0.22 | 50 | 94 | 1360 |
| T-PPDL(4)-PCL(4, 40) | 1.8 | — | — | 1.2 | 0.204 | 60 | 92 | 1280 |
| T-PPDL(4)-PCL(4, 25) | 2.25 | — | — | 0.75 | 0.18 | 75 | 94 | 1220 |
| T-PPDL(3)-PCL(20, 75) | 0.75 | 2.25 | — | — | 0.106 | 25 | 85 | 2080 |
| T-PPDL(3)-PCL(20, 50) | 1.5 | 1.5 | — | — | 0.186 | 50 | 84 | 1940 |
| T-PPDL(3)-PCL(20, 25) | 2.25 | 0.75 | — | — | 0.250 | 75 | 90 | 1250 |

TABLE 1-continued

Approaches for producing the networks from PCL(4)-OH, PCL(8)-OH, PCL(20)-OH, PPDL(2)-OH, PPDL(3)-OH, PPDL(4)-OH and TMDI according to the polycondensation method A) (indicated by the prefix T); network designation: PPDL(x)-PCL(y,z) are polymer networks made from the following star-shaped pre-polymers: 3-arm PPDL with Mn about x · 1000 g/mole and 4-arm PCL with $M_n$ about y · 1000 g/mole and a fraction of z mass-%;

| Designation | PPDL(y)-OH (g) | PCL(20)-OH (g) | PCL(8)-OH (g) | PCL(4)-OH (g) | TMDI (ml) | $\mu_{PPDL}$ (wt.-%) | Content (wt.-%) | Degree of swelling in chloroform (wt.-%) |
|---|---|---|---|---|---|---|---|---|
| T-PPDL(3)-PCL(8, 75) | 0.75 | — | 2.25 | — | 0.200 | 25 | 98 | 800 |
| T-PPDL(3)-PCL(8, 50) | 1.5 | — | 1.5 | — | 0.238 | 50 | 97 | 790 |
| T-PPDL(3)-PCL(8, 25) | 2.25 | — | 0.75 | — | 0.275 | 75 | 98 | 800 |
| T-PPDL(3)-PCL(4, 75) | 0.75 | — | — | 2.25 | 0.302 | 25 | 95 | 1050 |
| T-PPDL(3)-PCL(4, 50) | 1.5 | — | — | 1.5 | 0.306 | 50 | 96 | 880 |
| T-PPDL(3)-PCL(4, 25) | 2.25 | — | — | 0.75 | 0.309 | 75 | 97 | 830 |
| T-PPDL(2)-PCL(20, 75) | 0.75 | 2.25 | — | — | 0.138 | 25 | 90 | 1620 |
| T-PPDL(2)-PCL(20, 50) | 1.5 | 1.5 | — | — | 0.215 | 50 | 88 | 1710 |
| T-PPDL(2)-PCL(20, 25) | 2.25 | 0.75 | — | — | 0.293 | 75 | 95 | 1170 |
| T-PPDL(2)-PCL(8, 75) | 0.75 | — | 2.25 | — | 0.214 | 25 | 98 | 800 |
| T-PPDL(2)-PCL(8, 50) | 1.5 | — | 1.5 | — | 0.66 | 50 | 98 | 820 |
| T-PPDL(2)-PCL(8, 25) | 2.25 | — | 0.75 | — | 0.318 | 75 | 97 | 920 |
| T-PPDL(2)-PCL(4, 75) | 0.75 | — | — | 2.25 | 0.317 | 25 | 96 | 1040 |
| T-PPDL(2)-PCL(4, 50) | 1.5 | — | — | 1.5 | 0.334 | 50 | 96 | 1030 |
| T-PPDL(2)-PCL(4, 25) | 2.25 | — | — | 0.75 | 0.352 | 75 | 93 | 1100 |

Synthesis of the Networks with the Polymerization Method B)

The produced hydroxy-telechelic star polymers PCL(x)-IEMA or PPDL(y)-IEMA are melted and mixed, whereafter a thermal radical initiator (AIBN, BPO) is added. Here too, mixtures with 25-75 wt.-% PPDL have been found to be suitable for triple-shape-memory polymer mixtures. Polymerization can alternatively also occur photochemically. The functionalized oligomers are hereby melted, a 1 mole-% photo initiator is added, the mixture is then mixed and photopolymerized by irradiation with a Hg-lamp.

TABLE 2

Approaches for preparing the networks from PCL(20)-IEMA and PPDL(4)-IEMA according to the polymerization method B) (indicated by the prefix P).

| Designation | PPDL(4)-IEMA (g) | PCL(8)-IEMA (g) | PCL(20)-IEMA (g) | $\mu_{PPDL}$ (wt.-%) | Gel content (wt.-%) | Degree of swelling in chloroform (wt.-%) |
|---|---|---|---|---|---|---|
| P-PPDL(4)-PCL(20, 75) | 0.75 | — | 2.25 | 25 | 87 | 840 |
| P-PPDL(4)-PCL(20, 60) | 1.20 | — | 1.80 | 40 | 58 | 1660 |
| P-PPDL(4)-PCL(20, 50) | 1.50 | — | 1.50 | 50 | 71 | 1050 |
| P-PPDL(4)-PCL(20, 40) | 1.80 | — | 1.20 | 60 | 54 | 1420 |
| P-PPDL(4)-PCL(20, 25) | 2.25 | — | 0.75 | 75 | 78 | 1000 |
| P-PPDL(4)-PCL(20, 12) | 2.625 | — | 0.375 | 88 | 87 | 650 |
| P-PPDL(4)-PCL(8, 75) | 0.75 | 2.25 | — | 25 | 88 | 620 |
| P-PPDL(4)-PCL(8, 60) | 1.20 | 1.8 | — | 40 | 70 | 900 |
| P-PPDL(4)-PCL(8, 50) | 1.50 | 1.5 | — | 50 | 87 | 590 |

TABLE 2-continued

Approaches for preparing the networks from PCL(20)-IEMA and PPDL(4)-IEMA according to the polymerization method B) (indicated by the prefix P).

| Designation | PPDL(4)-IEMA (g) | PCL(8)-IEMA (g) | PCL(20)-IEMA (g) | $\mu_{PPDL}$ (wt.-%) | Gel content (wt.-%) | Degree of swelling in chloroform (wt.-%) |
|---|---|---|---|---|---|---|
| P-PPDL(4)-PCL(8, 40) | 1.80 | 1.2 | — | 60 | 65 | 980 |
| P-PPDL(4)-PCL(8, 25) | 2.25 | 0.75 | — | 75 | 77 | 850 |

Thermal Properties of the Polymer Networks

The networks from PPDL and PCL with $M_n$ of 4000 g·mole$^{-1}$, 8000 g·mole$^{-1}$ and 20,000 g·mole$^{-1}$ have in DSC experiments to melting ranges in a temperature region from −100° C. to 100° C. They can therefore be considered as semi-crystalline systems. Tables 3 shows the thermal properties of the polymer networks. The two melting temperatures can be used as two $T_{trans}$ for the triple-shape effect.

TABLES 3

Thermal properties of the polymer networks according to the poly-condensation method A)

| Designation | $\mu_{PPDL}$ [wt.-%] | $T_g$ [°C.] | $T_{m1}$ [°C.] | $T_{m2}$ [°C.] | $\Delta H_1^{b)}$ [J·g$^{-1}$] | $\Delta H_{PCL}^{c)}$ [J·g$^{-1}$] | $\Delta H_2^{b)}$ [J·g$^{-1}$] | $\Delta H_{PPDL}^{c)}$ [J·g$^{-1}$] |
|---|---|---|---|---|---|---|---|---|
| T-PPDL(4) | 100 | n.d. | — | 79.4 | — | — | 99.4 | 99.4 |
| T-PPDL(4)-PCL(20, 75) | 25 | n.d. | 55.1 | 74.8 | 56.0 | 74.7 | 20.5 | 82.0 |
| T-PPDL(4)-PCL(20, 60) | 40 | n.d. | 54.3 | 76.9 | 40.6 | 67.7 | 30.7 | 76.8 |
| T-PPDL(4)-PCL(20, 50) | 50 | n.d. | 52.6 | 77.1 | 29.4 | 58.8 | 40.2 | 80.4 |
| T-PPDL(4)-PCL(20, 40) | 60 | n.d. | 53.5 | 79.1 | 32.8 | 82.0 | 53.3 | 88.8 |
| T-PPDL(4)-PCL(20, 25) | 75 | n.d. | 52.0 | 78.6 | 18.8 | 75.2 | 64.0 | 85.3 |
| T-PPDL(4)-PCL(8, 75) | 25 | −54.6 | 36.9 | 72.5 | 39.0 | 52.0 | 21.3 | 85.2 |
| T-PPDL(4)-PCL(8, 60) | 40 | −55.2 | 38.6 | 74.2 | 33.9 | 56.5 | 29.9 | 74.8 |
| T-PPDL(4)-PCL(8, 50) | 50 | n.d. | 39.9 | 77.5 | 30.4 | 60.8 | 44.0 | 88.0 |
| T-PPDL(4)-PCL(8, 40) | 60 | n.d. | 42.3 | 79.1 | 25.4 | 63.5 | 51.9 | 86.5 |
| T-PPDL(4)-PCL(8, 25) | 75 | n.d. | 42.8 | 79.5 | 17.6 | 70.4 | 71.1 | 94.8 |
| T-PPDL(4)-PCL(4, 75) | 25 | −47.8 | 31.0 | 71.7 | 34.0 | 45.3 | 19.2 | 76.8 |
| T-PPDL(4)-PCL(4, 60) | 40 | n.d. | 34.5 | 77.1 | 33.7 | 56.2 | 34.7 | 86.8 |
| T-PPDL(4)-PCL(4, 50) | 50 | n.d. | 33.1 | 75.1 | 24.0 | 48.0 | 46.2 | 92.4 |
| T-PPDL(4)-PCL(4, 40) | 60 | n.d. | 31.9 | 75.3 | 18.3 | 45.3 | 55.8 | 93.0 |
| T-PPDL(4)-PCL(4, 25) | 75 | n.d. | n.d. | 78.7 | n.d. | n.d. | 66.4 | 88.5 |
| T-PPDL(3)-PCL(20, 75) | 25 | −57.5 | 56.4 | 71.6 | 53.9 | 71.9 | 15.1 | 60.4 |
| T-PPDL(3)-PCL(20, 50) | 50 | n.d. | 54.0 | 73.4 | 40.6 | 81.2 | 36.8 | 73.6 |
| T-PPDL(3)-PCL(20, 25) | 75 | n.d. | 53.9 | 74.6 | 30.2 | 120.8 | 53.4 | 71.2 |
| T-PPDL(3)-PCL(8, 75) | 25 | −53.0 | 36.2 | 65.5 | 38.8 | 51.1 | 14.0 | 56.0 |
| T-PPDL(3)-PCL(8, 50) | 50 | n.d. | 32.7 | 61.6 | 28.6 | 57.2 | 39.4 | 78.8 |
| T-PPDL(3)-PCL(8, 25) | 75 | n.d. | 32.8 | 73.4 | 14.6 | 58.4 | 59.9 | 79.9 |
| T-PPDL(3)-PCL(4, 75) | 25 | −46.4 | 29.8 | 67.3 | 36.8 | 49.1 | 16.9 | 67.6 |
| T-PPDL(3)-PCL(4, 50) | 50 | n.d. | 27.1 | 72.0 | 24.6 | 49.2 | 40.5 | 81.0 |
| T-PPDL(3)-PCL(4, 25) | 75 | n.d. | n.d. | 68.7 | — | — | 70.6 | 70.6 |
| T-PPDL(2)-PCL(20, 75) | 25 | n.d. | 55.0 | n.d. | 66.1 | 66.1 | — | — |
| T-PPDL(2)-PCL(20, 50) | 50 | n.d. | 54.2 | 64.5 | 49.8 | 99.6 | 22.8 | 45.6 |
| T-PPDL(2)-PCL(20, 25) | 75 | n.d. | n.d. | 61.6 | — | — | 67.4 | 67.4 |
| T-PPDL(2)-PCL(8, 75) | 25 | −51.4 | 35.0 | 53.7 | 45.2 | 60.3 | 6.3 | 25.2 |
| T-PPDL(2)-PCL(8, 50) | 50 | n.d. | 31.3 | 54.0 | 30.4 | 60.8 | 23.6 | 47.2 |
| T-PPDL(2)-PCL(8, 25) | 75 | n.d. | n.d. | 58.4 | — | — | 63.0 | 63.0 |
| T-PPDL(2)-PCL(4, 75) | 25 | −45.2 | 27.7 | 52.8 | 40.6 | 54.1 | 11.1 | 44.4 |
| T-PPDL(2)-PCL(4, 50) | 50 | n.d. | 28.3 | 57.7 | 18.7 | 37.4 | 27.7 | 55.4 |
| T-PPDL(2)-PCL(4, 25) | 75 | n.d. | n.d. | 63.5 | — | — | 65.7 | 65.7 |

TABLE 4

Thermal properties of the polymer networks according to the polymerization method B)

| Designation | $\mu_{PPDL}$ wt.-% | $T_{m1}$ °C. | $T_{m2}$ °C. | $\Delta H_1$ J/g | $\Delta H_2$ J/g |
|---|---|---|---|---|---|
| P-PPDL(4)-PCL(20, 75) | 25 | 47.0 | 68.6 | 50.7 | 15.0 |
| P-PPDL(4)-PCL(20, 60) | 40 | 54.1 | 67.9/83.5 | 46.5 | 27.6 |
| P-PPDL(4)-PCL(20, 50) | 50 | 53.7 | 70.0/83.8 | 32.6 | 46.1 |
| P-PPDL(4)-PCL(20, 40) | 60 | 54.1 | 74.1/84.3 | 20.3 | 63.0 |
| P-PPDL(4)-PCL(20, 25) | 75 | 52.9 | 81.7 | 22.7 | 47.1 |
| P-PPDL(4)-PCL(20, 12) | 88 | 51.8 | 87.7 | 19.5 | 53.8 |
| P-PPDL(4)-PCL(8, 75) | 25 | 43.3 | 67.9 | 14.3 | 30.6 |
| P-PPDL(4)-PCL(8, 60) | 40 | 47.2 | 71.7/81.5 | 24.8 | 51.9 |

TABLE 4-continued

Thermal properties of the polymer networks according to the polymerization method B)

| Designation | $\mu_{PPDL}$ wt.-% | $T_{m1}$ °C. | $T_{m2}$ °C. | $\Delta H_1$ J/g | $\Delta H_2$ J/g |
|---|---|---|---|---|---|
| P-PPDL(4)-PCL(8, 50) | 50 | 20.9 | 67.9 | 16.7 | 38.0 |
| P-PPDL(4)-PCL(8, 40) | 60 | 46.5 | 70.4 | — | 66.9 |
| P-PPDL(4)-PCL(8, 25) | 75 | 46.4 | 73.0/82.2 | 16.1 | 74.8 |

Mechanical Properties of the Polymer Networks

The mechanical properties of the networks are determined at 25° C., 60° C. and 100° C. by performing tensile tests. Whereas semi-crystalline materials are present at 25° C., the networks are in a rubber-elastic state at 100° C. Both temperature ranges are relevant for an application as shape-memory material, because they determine below $T_{trans}$ the mechanical properties of the test sample in the permanent and temporary shape before programming and before completed recovery. However, the mechanical properties above $T_{trans}$ are important with regard to programming of the temporary shape. With tensile tests at 60° C., the mechanical properties of the materials are also measured at the temperature which is to be selected for programming the second shape.

At 25° C., the mechanical properties are determined by the glassy state of the materials. The networks from PPDL, PCL and TMDI show in tensile tests a yield point accompanied by constriction of the sample.

The E-modules E have values between 134 MPa and 430 MPa. The tensile strength $\sigma_{max}$ is in a range from 15 MPa to 31 MPa at elongations $\epsilon_{max}$ of 6% to 16%. The observed average values for the elongation at break $\epsilon_b$ are between 400% and 1000%. The mechanical characteristics of the investigated networks according to the poly-condensation method A) are listed in Table 5.

TABLE 5

Mechanical properties of the polymer networks according to poly-condensation method A at 25° C., 60° C. and 100° C.

| | | 25° C. | | | 60° C. | | | 100° C. | | |
|---|---|---|---|---|---|---|---|---|---|---|
| Designation | $\mu_{PPDL}$ [wt %] | E [MPa] | $\sigma_b$ [MPa] | $\epsilon_b$ [%] | E [MPa] | $\sigma_b$ [MPa] | $\epsilon_b$ [%] | E [MPa] | $\sigma_b$ [MPa] | $\epsilon_b$ [%] |
| T-PPDL(4) | 100 | 370 ± 87 | 20.9 ± 2.6 | 523 ± 35 | 102 ± 16 | 9.9 ± 1.2 | 690 ± 54 | 0.65 ± 0.13 | 1.25 ± 0.21 | 561 ± 68 |
| T-PPDL(4)-PCL(20, 75) | 25 | 273 ± 20 | 29.5 ± 2.3 | 717 ± 22 | 15.8 ± 1.3 | 4.8 ± 0.7 | 441 ± 26 | 1.84 ± 0.28 | 1.33 ± 0.12 | 171 ± 43 |
| T-PPDL(4)-PCL(20, 60) | 40 | 332 ± 24 | 24.6 ± 3.9 | 621 ± 86 | 22.4 ± 3.3 | 6.8 ± 1.4 | 484 ± 38 | 2.16 ± 0.30 | 1.80 ± 0.20 | 254 ± 45 |
| T-PPDL(4)-PCL(20, 50) | 50 | 319 ± 16 | 30.4 ± 3.5 | 715 ± 43 | 28.9 ± 2.6 | 6.3 ± 0.9 | 463 ± 24 | 1.88 ± 0.26 | 1.91 ± 0.16 | 199 ± 21 |
| T-PPDL(4)-PCL(20, 40) | 60 | 272 ± 20 | 28.5 ± 4.7 | 692 ± 59 | 23.3 ± 4.1 | 12.5 ± 2.6 | 588 ± 47 | 2.08 ± 0.60 | 1.18 ± 0.28 | 117 ± 7 |
| T-PPDL(4)-PCL(20, 25) | 75 | 300 ± 15 | 32.4 ± 4.2 | 664 ± 59 | 35.1 ± 3.0 | 8.2 ± 0.8 | 489 ± 22 | 2.36 ± 0.22 | 1.43 ± 0.22 | 151 ± 30 |
| T-PPDL(4)-PCL(8, 75) | 25 | 101 ± 16 | 20.3 ± 4.0 | 587 ± 49 | 8.0 ± 0.7 | 5.0 ± 0.8 | 292 ± 48 | 3.75 ± 0.35 | 2.12 ± 0.31 | 126 ± 20 |
| T-PPDL(4)-PCL(8, 60) | 40 | 185 ± 18 | 27.8 ± 4.3 | 665 ± 59 | 7.3 ± 1.3 | 6.1 ± 0.7 | 471 ± 30 | 3.25 ± 0.08 | 1.92 ± 0.23 | 159 ± 41 |
| T-PPDL(4)-PCL(8, 50) | 50 | 207 ± 18 | 23.6 ± 2.6 | 764 ± 29 | 12.7 ± 2.5 | 7.5 ± 0.9 | 616 ± 23 | 2.41 ± 0.31 | 1.23 ± 0.25 | 103 ± 18 |
| T-PPDL(4)-PCL(8, 40) | 60 | 257 ± 49 | 24.8 ± 3.5 | 707 ± 85 | 21.1 ± 6.7 | 6.3 ± 2.0 | 549 ± 43 | 1.97 ± 0.20 | 1.33 ± 0.13 | 206 ± 54 |
| T-PPDL(4)-PCL(8, 25) | 75 | 340 ± 33 | 25.8 ± 2.5 | 693 ± 46 | 45.8 ± 8.4 | 9.1 ± 1.1 | 557 ± 62 | 1.79 ± 0.12 | 1.22 ± 0.18 | 230 ± 52 |
| T-PPDL(4)-PCL(4, 75) | 25 | 73 ± 15 | 20.5 ± 2.0 | 673 ± 28 | 6.7 ± 0.9 | 2.9 ± 0.6 | 151 ± 40 | 3.38 ± 0.26 | 1.33 ± 0.10 | 65 ± 10 |
| T-PPDL(4)-PCL(4, 60) | 40 | 179 ± 17 | 27.1 ± 2.5 | 714 ± 27 | 16.1 ± 5.8 | 3.4 ± 0.5 | 228 ± 39 | 2.98 ± 0.11 | 1.54 ± 0.07 | 103 ± 9 |
| T-PPDL(4)-PCL(4, 50) | 50 | 131 ± 21 | 21.2 ± 3.4 | 486 ± 42 | 18.2 ± 3.8 | 4.3 ± 1.0 | 263 ± 37 | 2.53 ± 0.21 | 1.80 ± 0.14 | 206 ± 40 |
| T-PPDL(4)-PCL(4, 40) | 60 | 154 ± 10 | 24.9 ± 1.9 | 562 ± 32 | 34.1 ± 7.0 | 7.5 ± 1.9 | 346 ± 40 | 2.23 ± 0.12 | 1.33 ± 0.16 | 155 ± 30 |
| T-PPDL(4)-PCL(4, 25) | 75 | 274 ± 22 | 25.3 ± 3.9 | 691 ± 57 | 59.8 ± 6.2 | 8.9 ± 0.7 | 521 ± 39 | 1.47 ± 0.13 | 1.01 ± 0.16 | 188 ± 48 |
| T-PPDL(3)-PCL(20, 75) | 25 | 305 ± 43 | 25.2 ± 3.5 | 691 ± 51 | 2.3 ± 0.2 | 2.3 ± 0.3 | 457 ± 50 | 0.87 ± 0.07 | 0.95 ± 0.13 | 286 ± 62 |
| T-PPDL(3)-PCL(20, 50) | 50 | 282 ± 21 | 19.7 ± 2.7 | 543 ± 36 | 10.5 ± 0.9 | 3.8 ± 0.2 | 461 ± 19 | 0.92 ± 0.02 | 0.83 ± 0.06 | 235 ± 23 |
| T-PPDL(3)-PCL(20, 25) | 75 | 242 ± 23 | 31.2 ± 5.0 | 595 ± 53 | 20.7 ± 1.9 | 8.4 ± 1.3 | 503 ± 39 | 1.79 ± 0.10 | 1.20 ± 0.10 | 146 ± 22 |
| T-PPDL(3)-PCL(8, 75) | 25 | 37 ± 7 | 11.0 ± 2.9 | 425 ± 99 | 4.3 ± 0.3 | 2.3 ± 0.2 | 140 ± 24 | 4.82 ± 0.19 | 1.72 ± 0.35 | 57 ± 17 |
| T-PPDL(3)-PCL(8, 50) | 50 | 64 ± 12 | 15.9 ± 1.9 | 433 ± 26 | 9.9 ± 0.6 | 4.4 ± 0.5 | 226 ± 32 | 4.29 ± 0.19 | 1.62 ± 0.23 | 62 ± 17 |
| T-PPDL(3)-PCL(8, 25) | 75 | 97 ± 13 | 23.7 ± 2.3 | 437 ± 23 | 3.9 ± 0.1 | 5.9 ± 0.9 | 260 ± 46 | 3.70 ± 0.10 | 1.82 ± 0.19 | 92 ± 16 |
| T-PPDL(3)-PCL(4, 75) | 25 | 58 ± 9 | 20.8 ± 4.5 | 525 ± 48 | 3.0 ± 0.4 | 1.7 ± 0.2 | 140 ± 36 | 2.60 ± 0.11 | 1.07 ± 0.16 | 67 ± 15 |
| T-PPDL(3)-PCL(4, 50) | 50 | 67 ± 10 | 18.6 ± 3.5 | 423 ± 57 | 12.9 ± 1.5 | 4.6 ± 0.7 | 164 ± 43 | 3.40 ± 0.12 | 1.47 ± 0.11 | 69 ± 9 |
| T-PPDL(3)-PCL(4, 25) | 75 | 84 ± 11 | 23.4 ± 6.9 | 405 ± 47 | 19.7 ± 1.3 | 6.1 ± 0.4 | 195 ± 11 | 3.75 ± 0.11 | 1.67 ± 0.38 | 83 ± 30 |
| T-PPDL(2)-PCL(20, 75) | 25 | 178 ± 55 | 17.2 ± 5.5 | 684 ± 91 | 1.5 ± 0.2 | 2.0 ± 0.4 | 521 ± 68 | 1.44 ± 0.07 | 1.04 ± 0.20 | 188 ± 64 |
| T-PPDL(2)-PCL(20, 50) | 50 | 206 ± 12 | 24.4 ± 3.2 | 784 ± 52 | 4.3 ± 0.9 | 3.7 ± 0.5 | 614 ± 51 | 1.28 ± 0.07 | 0.97 ± 0.09 | 207 ± 36 |
| T-PPDL(2)-PCL(20, 25) | 75 | 134 ± 10 | 26.6 ± 4.4 | 649 ± 20 | 5.7 ± 1.9 | 4.7 ± 1.1 | 463 ± 34 | 2.28 ± 0.08 | 1.16 ± 0.15 | 110 ± 30 |
| T-PPDL(2)-PCL(8, 75) | 25 | 23 ± 4 | 9.7 ± 1.4 | 384 ± 49 | 4.0 ± 0.1 | 2.0 ± 0.4 | 107 ± 35 | 4.74 ± 0.29 | 1.36 ± 0.36 | 42 ± 20 |
| T-PPDL(2)-PCL(8, 50) | 50 | 52 ± 12 | 13.6 ± 2.5 | 459 ± 70 | 3.4 ± 0.2 | 2.0 ± 0.5 | 141 ± 58 | 4.03 ± 0.17 | 1.53 ± 0.34 | 66 ± 22 |
| T-PPDL(2)-PCL(8, 25) | 75 | 76 ± 10 | 24.0 ± 6.2 | 605 ± 34 | 3.1 ± 0.2 | 2.7 ± 0.6 | 270 ± 68 | 3.18 ± 0.21 | 1.33 ± 0.23 | 71 ± 18 |
| T-PPDL(2)-PCL(4, 75) | 25 | 18 ± 12 | 15.8 ± 3.6 | 502 ± 31 | 2.6 ± 0.2 | 1.5 ± 0.4 | 110 ± 42 | 2.68 ± 0.06 | 1.11 ± 0.13 | 67 ± 13 |
| T-PPDL(2)-PCL(4, 50) | 50 | 15 ± 3 | 19.1 ± 3.1 | 606 ± 23 | 3.1 ± 0.3 | 1.9 ± 0.2 | 161 ± 21 | 2.84 ± 0.05 | 1.07 ± 0.19 | 59 ± 18 |
| T-PPDL(2)-PCL(4, 25) | 75 | 65 ± 17 | 21.8 ± 3.1 | 616 ± 67 | 3.6 ± 0.5 | 3.8 ± 0.4 | 396 ± 44 | 1.99 ± 0.07 | 0.92 ± 0.11 | 76 ± 16 |

TABLE 6

Mechanical properties of the polymer networks according to polymerization method B)

| | | 25° C. | | | 60° C. | | | 100° C. | | |
|---|---|---|---|---|---|---|---|---|---|---|
| Designation | $\mu_{PPDL}$ [wt %] | E [MPa] | $\sigma_b$ [MPa] | $\epsilon_b$ [%] | E [MPa] | $\sigma_b$ [MPa] | $\epsilon_b$ [%] | E [MPa] | $\sigma_b$ [MPa] | $\epsilon_b$ [%] |
| P-PPDL(4)-PCL(20, 75) | 25 | 245 ± 5 | 17.2 ± 4.4 | 160 ± 84 | 3.7 ± 0.4 | 3.8 ± 0.6 | 180 ± 25 | 2.03 ± 0.39 | 1.41 ± 0.51 | 90 ± 20 |
| P-PPDL(4)-PCL(20, 60) | 40 | 270 ± 18 | 9.7 ± 0.7 | 4.3 ± 0.5 | 6.1 ± 0.4 | 1.1 ± 0.2 | 70 ± 12 | 1.54 ± 0.20 | 0.70 ± 0.04 | 60 ± 10 |
| P-PPDL(4)-PCL(20, 50) | 50 | 200 ± 10 | 12.8 ± 0.8 | 11 ± 1.7 | 10.1 ± 6.7 | 1.2 ± 0.3 | 30 ± 15 | 1.25 ± 0.05 | 0.79 ± 0.18 | 80 ± 14 |

TABLE 6-continued

Mechanical properties of the polymer networks according to polymerization method B)

| | | 25° C. | | | 60° C. | | | 100° C. | | |
|---|---|---|---|---|---|---|---|---|---|---|
| Designation | $\mu_{PPDL}$ [wt %] | E [MPa] | $\sigma_b$ [MPa] | $\epsilon_b$ [%] | E [MPa] | $\sigma_b$ [MPa] | $\epsilon_b$ [%] | E [MPa] | $\sigma_b$ [MPa] | $\epsilon_b$ [%] |
| P-PPDL(4)-PCL(20, 40) | 60 | 289 ± 34 | 8.0 ± 1.0 | 3.3 ± 0.6 | 6.8 ± 2.9 | 1.0 ± 0.1 | 40 ± 39 | 1.58 ± 0.56 | 0.60 ± 0.37 | 45 ± 22 |
| P-PPDL(4)-PCL(20, 25) | 75 | 273 ± 11 | 11.7 ± 0.65 | 28 ± 11 | 26.0 ± 2.1 | 2.5 ± 2.9 | 30 ± 8 | 2.19 ± 0.17 | 1.06 ± 0.03 | 65 ± 2 |
| P-PPDL(4)-PCL(20, 12) | 88 | 121 ± 4 | 8.2 ± 0.4 | 60 ± 11 | 22.8 ± 4.8 | 2.7 ± 0.4 | 23 ± 10 | 3.62 ± 0.64 | 1.24 ± 0.68 | 52 ± 15 |
| P-PPDL(4)-PCL(8, 75) | 25 | 121 ± 4.2 | 8.3 ± 3.7 | 63 ± 11 | 6.69 ± 1.68 | 1.5 ± 0.8 | 48 ± 14 | 4.46 ± 1.12 | 1.43 ± 0.55 | 44 ± 2 |
| P-PPDL(4)-PCL(8, 60) | 40 | 181 ± 15 | 8.8 ± 1.0 | 25 ± 30 | 9.56 ± 6.23 | 1.3 ± 0.6 | 20 ± 3 | 2.52 ± 0.58 | 0.56 ± 0.50 | 30 ± 20 |
| P-PPDL(4)-PCL(8, 50) | 50 | 126 ± 30 | 9.9 ± 1.6 | 90 ± 24 | 11.7 ± 1.02 | 2.6 ± 0.4 | 46 ± 12 | 4.69 ± 0.29 | 1.53 ± 0.58 | 40 ± 13 |
| P-PPDL(4)-PCL(8, 40) | 60 | 241 ± 10 | 7.0 ± 1.4 | 4 ± 1 | 21.4 ± 4.4 | 1.2 ± 0.3 | 9 ± 4 | 1.89 ± 0.16 | 0.62 ± 0.03 | 42 ± 7 |
| P-PPDL(4)-PCL(8, 25) | 75 | 203 ± 25 | 9.4 ± 1.1 | 37 ± 38 | 23.9 ± 1.2 | 2.0 ± 0.2 | 18 ± 4 | 2.2 ± 0.3 | 0.45 ± 0.24 | 22 ± 13 |

Triple-Shape-Memory Properties of the Polymer Networks
Experiment A

In both synthesis methods (A and B), the permanent shape (1. shape) is fixed by the cross-linking. The first programming is performed (2. shape) by bending a sample end perpendicularly at 100° C. and subsequent cooling to 60° C. The second programming (3. shape) is performed by perpendicularly bending the second sample end at 60° C. and subsequent cooling to 0° C. When immersing a test sample programmed in this way in a water bath having a temperature of 60° C., the sample side with the lower $T_{switch}$ (2. shape) is initially recovered. This process requires that the switching temperature in the test sample is reached and lasts only for several seconds. The other sample side remains unchanged. The second sample side is also recovered to form an overall planar body (1. shape) by increasing the temperature of the water bath or by immersing the sample in a second water bath at 100° C.

Experiment B

The triple-shape-memory effect is quantitatively investigated by cyclic thermo-mechanical tensile tests, as described in Bellin et al. (see above). The shape-memory properties of the networks of PPDL(y) and PCL(x) with varying molar mass, as determined by tension-controlled, cyclic thermo-mechanical tensile tests, are listed in Table 7. The investigations show that these materials have stretch fixation and stretch return ratios of more than 90% in all cycles.

The employed polymers may be biostable or biodegradable. Multiblock copolymers which have a switching temperature in the range of the human body temperature are known for medical applications.

TABLE 7

Triple-shape-memory properties of the polymer networks according to the poly-condensation method A. $R_f$ and $R_r$ are averaged values from the cycles 2 to 5. The switching temperatures are averaged values from all 5 cycles.

| Designation | $R_f(C\rightarrow B)$ [%] | $R_f(B\rightarrow A)$ [%] | $R_r(A\rightarrow B)$ [%] | $R_r(A\rightarrow C)$ [%] | $T_{sw1}$ [° C.] | $T_{sw2}$ [° C.] |
|---|---|---|---|---|---|---|
| T-PPDL(4)-PCL(20, 75) | 74.5 ± 1.0 | 99.0 ± 0.1 | 56.2 ± 1.0 | 96.3 ± 7.0 | 66.0 ± 0.8 | 85.3 ± 1.1 |
| T-PPDL(4)-PCL(20, 60) | 80.1 ± 0.5 | 98.2 ± 0.1 | 81.1 ± 0.7 | 101.0 ± 0.5 | 61.0 ± 0.5 | 84.4 ± 0.5 |
| T-PPDL(4)-PCL(20, 50) | 72.5 ± 0.8 | 97.6 ± 0.2 | 80.5 ± 1.0 | 99.0 ± 1.0 | 61.1 ± 0.3 | 85.4 ± 0.3 |
| T-PPDL(4)-PCL(20, 40) | 82.1 ± 1.6 | 96.3 ± 0.1 | 85.1 ± 0.7 | 99.9 ± 3.2 | 59.2 ± 0.4 | 86.2 ± 0.5 |
| T-PPDL(4)-PCL(20, 25) | 91.5 ± 0.1 | 91.4 ± 1.0 | 78.8 ± 0.8 | 98.5 ± 2.2 | 62.1 ± 0.7 | 85.8 ± 0.5 |
| T-PPDL(4)-PCL(8, 75) | 17.6 ± 0.9 | 94.2 ± 1.4 | 88.0 ± 2.1 | 99.8 ± 0.6 | 39.9 ± 0.7 | 70.5 ± 0.1 |
| T-PPDL(4)-PCL(8, 60) | 64.2 ± 2.8 | 96.2 ± 0.3 | 88.2 ± 0.9 | 101.1 ± 1.6 | 48.0 ± 0.4 | 76.3 ± 0.4 |
| T-PPDL(4)-PCL(8, 50) | 75.2 ± 0.6 | 95.7 ± 0.3 | 84.1 ± 0.7 | 100.1 ± 0.5 | 55.4 ± 0.8 | 81.8 ± 0.3 |
| T-PPDL(4)-PCL(8, 40) | 86.6 ± 0.2 | 91.6 ± 0.2 | 88.3 ± 2.1 | 99.1 ± 3.8 | 56.5 ± 0.9 | 83.9 ± 0.4 |
| T-PPDL(4)-PCL(8, 25) | 93.8 ± 0.3 | 89.5 ± 0.2 | 80.2 ± 1.0 | 100.1 ± 2.6 | 61.1 ± 0.6 | 84.1 ± 0.4 |
| T-PPDL(4)-PCL(4, 75) | 2.0 ± 0.9 | 97.7 ± 0.1 | 76.5 ± 0.8 | 99.8 ± 0.3 | 36.7 ± 0.4 | 68.8 ± 0.3 |
| T-PPDL(4)-PCL(4, 60) | 75.5 ± 1.3 | 95.2 ± 0.3 | 81.1 ± 1.5 | 100.5 ± 1.2 | 48.5 ± 0.5 | 82.1 ± 1.1 |
| T-PPDL(4)-PCL(4, 50) | 84.9 ± 1.0 | 93.2 ± 3.7 | 68.1 ± 2.3 | 100.5 ± 0.8 | 48.0 ± 1.0 | 76.4 ± 1.0 |
| T-PPDL(4)-PCL(4, 40) | 82.0 ± 0.8 | 92.0 ± 0.3 | 75.6 ± 4.3 | 99.2 ± 1.0 | 56.3 ± 0.9 | 75.9 ± 0.1 |
| T-PPDL(4)-PCL(4, 25) | 93.1 ± 0.2 | 81.7 ± 4.1 | 83.8 ± 1.7 | 99.4 ± 2.4 | 59.5 ± 1.2 | 83.1 ± 0.4 |

Experiment C

For determining the one-step programming properties of the triple-shape-memory networks, the sample is stretched at the temperature $T_{high}$ from the permanent shape C with the elongation $\epsilon_c$ into the shape $\epsilon^0_A$. After a waiting period of seven minutes, the sample is cooled under controlled tension with a cooling grade of 5 K·min$^{-1}$, whereby the sample acquires the elongation $\epsilon^0_{Aload}$. The sample is relaxed after 10 minutes, which results in the elongation $\epsilon_A$ and the shape A, respectively. The sample is subsequently recovered, as described in Bellin et al.

$$R_f(N) = \frac{\varepsilon_A(N) - \varepsilon_C(N-1)}{\varepsilon_{Aload}(N) - \varepsilon_C(N-1)} \quad (1)$$

$$R_r(N) = \frac{\varepsilon_A(N) - \varepsilon_C(N)}{\varepsilon_A(N) - \varepsilon_C(N-1)} \quad (2)$$

TABLE 8

Shape-memory properties of the polymer networks according to the poly-condensation method A after one-step programming.

| Designation | $R_f$ [%] | $R_r$ [%] | $T_{sw1}$ [° C.] | $T_{sw2}$ [° C.] |
|---|---|---|---|---|
| T-PPDL(4)-PCL(20, 60) | 97.2 ± 0.4 | 98.8 ± 0.8 | 60.6 ± 0.1 | 80.2 ± 0.6 |
| T-PPDL(4)-PCL(8, 60) | 98.2 ± 0.2 | 98.2 ± 0.9 | 49.8 ± 0.2 | 75.4 ± 0.4 |
| T-PPDL(4)-PCL(4, 50) | 95.8 ± 0.3 | 99.3 ± 0.2 | 46.5 ± 0.8 | 78.3 ± 0.3 |

Experiment D

For determining the triple-shape-memory properties with cold stretching, the sample is stretched at the temperature $T_{low}$ from the permanent shape C with the elongation $\varepsilon_c$ into the shape $\varepsilon^0_A$, kept under tension for five minutes and then relaxed, whereby the sample acquires the elongation $\varepsilon_A$ and the shape A, respectively. The recovery of the sample is then performed as described in Bellin et al. The cycle is repeated four times, the stretch fixation ratio $R_f$ and the stretch recovery ratio $R_r$ in the cycle N are determined in the manner described in experiment C.

TABLE 9

Shape-memory properties of the polymer networks according to the poly-condensation method A after cold stretching.

| Designation | $R_f$ [%] | $R_r$ [%] | $T_{sw1}$ [° C.] | $T_{sw2}$ [° C.] |
|---|---|---|---|---|
| T-PPDL(4)-PCL(20, 75) | 78.8 ± 0.2 | 99.8 ± 0.3 | 62.1 ± 0.1 | 83.5 ± 0.5 |
| T-PPDL(4)-PCL(20, 50) | 76.9 ± 0.3 | 99.9 ± 1.1 | 60.3 ± 0.3 | 75.8 ± 0.5 |
| T-PPDL(4)-T-PCL(8, 50) | 72.2 ± 0.3 | 99.7 ± 0.2 | 56.1 ± 0.6 | 82.6 ± 0.4 |
| PPDL(4)-PCL(4, 50) | 64.8 ± 0.3 | 97.7 ± 0.5 | 47.8 ± 0.6 | 81.5 ± 0.3 |

Experiment E

For determining the shape-memory properties, a fourfold cyclic thermo-mechanical experiment was created. The sample was hereby stretched at $T_{prog}$ from the permanent shape C with the elongation $\varepsilon_C$ into the shape $\varepsilon^0_A$ (100% and 150%, respectively), kept under tension for five minutes and subsequently cooled under controlled tension with a cooling grade of 5 K·min$^{-1}$, whereby the sample attains the elongation $\varepsilon^0_{Aload}$. After 10 minutes, the sample is relaxed, resulting in the elongation $\varepsilon_A$ and the shape A, respectively. Recovery is performed by heating to $T_{high}$=115° C. at a heating rate of 1 K·min$^{-1}$. To eliminate the previous thermal history of the sample, $T_{prog}$=90° C. was selected in the first cycle. In the subsequent three cycles, 30, 60 and 90° C. were selected for $T_{prog}$. The switching temperatures were determined in the same manner as described in experiment B.

TABLE 10

Temperature memory properties of the polymer network according to the poly-condensation method A.

| | $T_{prog}$ = 30° C. | | | $T_{prog}$ = 60° C. | | | $T_{prog}$ = 90° C. | | |
|---|---|---|---|---|---|---|---|---|---|
| Designation | $R_f$ [%] | $R_r$ [%] | $T_{sw}$ [° C.] | $R_f$ [%] | $R_r$ [%] | $T_{sw}$ [° C.] | $R_f$ [%] | $R_r$ [%] | $T_{sw}$ [° C.] |
| T-PPDL(4)-PCL(8, 25) | 81.9 | 98.1 | 29.2 | 93.4 | 96.9 | 59.0 | 98.6 | 99.6 | 78.4 |
| T-PPDL(4)-PCL(4, 40) | 81.6 | 100.2 | 28.6 | 91.4 | 97.3 | 59.3 | 97.4 | 99.9 | 75.0 |
| T-PPDL(4)-PCL(4, 25) | 81.1 | 97.6 | 29.1 | 92.0 | 101.8 | 59.0 | 98.4 | 101.0 | 81.1 |

Experiment F

For determining the reversible triple-shape-memory properties under constant tension, the sample is stretched at $T_{high}$ from the permanent shape C with the tension $\sigma_c$ into the shape $\varepsilon_c$. After waiting for 10 minutes, the sample is cooled under constant tension $\sigma_c$ to $T_{low}$ with a cooling grade between 0.1 and 2 K/min, resulting in a two-stage elongation of the sample to the shapes B and A with the elongations $\varepsilon_B$ and $\varepsilon_A$. After 10 minutes at $T_{low}$, the sample is heated to $T_{high}$ with a heating rate of 1 K/min, whereby the shapes B and C are stepwise recovered.

TABLE 11

Reversible triple-shape-memory properties of the polymer networks according to the poly-condensation method A under constant tension.

| Network-ID | $\sigma_c$ [MPa] | $T_{sw}$(C→B) [° C.] | $T_{sw}$(B→A) [° C.] | $T_{sw}$(A→B) [° C.] | $T_{sw}$(B→C) [° C.] | $\Delta\varepsilon_{rev}$(A→B) [%] | $\Delta\varepsilon_{rev}$(B→C) [%] |
|---|---|---|---|---|---|---|---|
| T-PPDL(4)-PCL(8, 50) | 0.6 | 69.4 | 37.3 | 45.3 | 78.5 | 9 | 91 |
| T-PPDL(3)-PCL(8, 50) | 1.0 | 60.5 | 32.6 | 43.2 | 75.7 | 22 | 78 |

Preparation of Multilayer Materials

The polymer networks prepared with the polymerization method B were synthesized in layers having a thickness of 0.5 mm. The individual polymer layers are programmed according to the Experiment B. The degree of this mono-directional stretching can be selected over a wide range. In a demonstration experiment, two layers were glued together, wherein one layer was pre-stretched by 20%. However, the programming direction of the layers may also deviate from one another after gluing. Cyanacrylate chemistry was used for gluing to attain a solid and permanent bond between the two layers.

The expected mechanical properties of the composite materials can be calculated with the help of computer modeling studies. These modeling studies provide details for programming and stacking the layers for attaining particular shape changes of the material.

Figure 3:
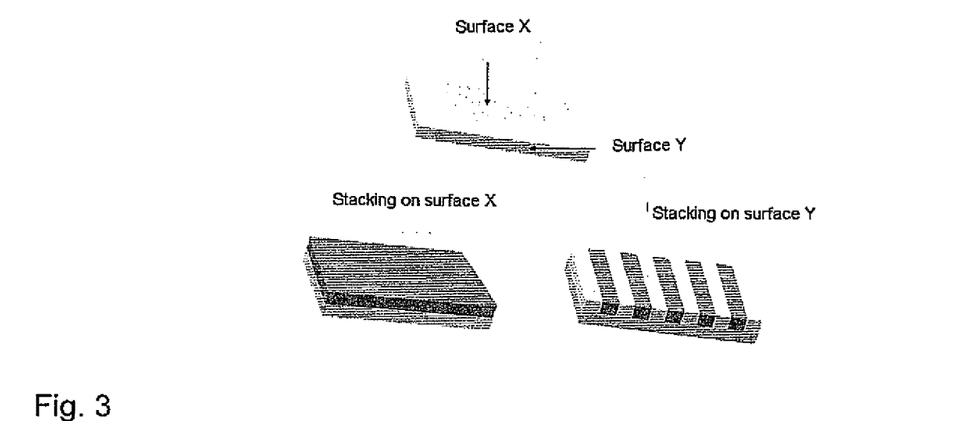
FIGS. 3 to 5 layer systems made of polymer shape-memory materials in different variants.
Figure 4:
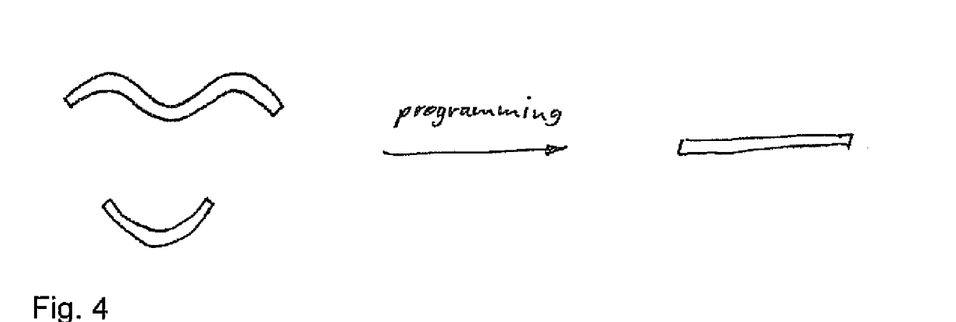
Figure 5:
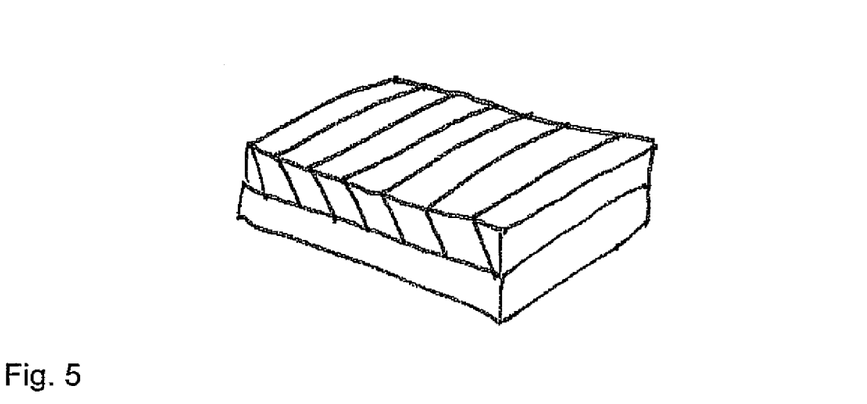
Figure 6:
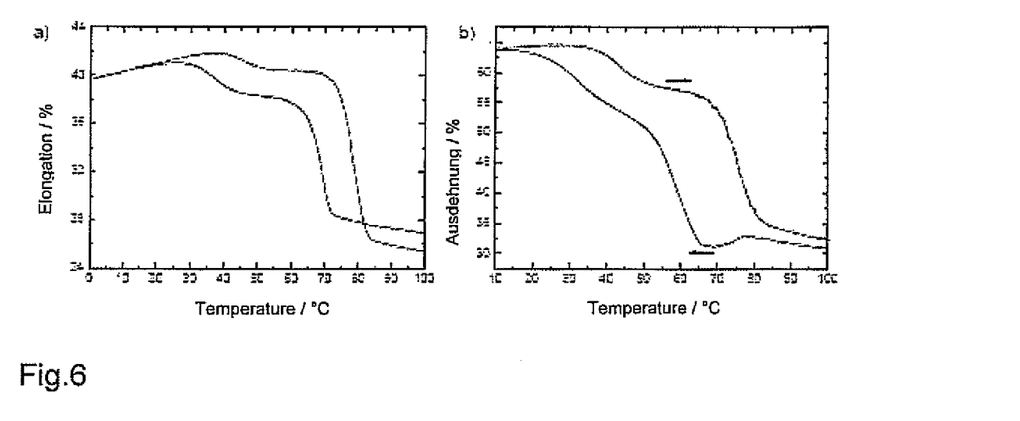
FIG. 6 reversible triple-shape-memory properties of the network a: T-PPDL(4)-PCL(8,50) at a tension of 0.6 MPa; b: T-PPDL(3)-PCL(8,50) at a tension of 1 MPa.

FIG. 3 shows layer systems made of triple-shape-memory polymers. FIG. 4 shows individual layers with a 3-D profile, which can be programmed in a planar structure and form a layer system in conjunction with other planar or planar-programmed layers. FIG. 5 shows a layer system of layers stacked above one another on a surface X; the stacked layers are cut at arbitrary angles into layers and can then be stacked to form new layer systems. FIG. 6 shows reversible triple-shape-memory properties of the network a: T-PPDL(4)-PCL(8,50) at a tension of 0.6 MPa; b: T-PPDL(3)-PCL(8,50) at a tension of 1 MPa.

The invention claimed is:

1. Polymer network with triple-shape-memory effect, comprising:
   A) a first crystalline switching segment made of a star polymer based on poly(pentadecalactone)(PPDL segment); and
   B) a second crystalline switching segment made of a star polymer based on poly(ε-caprolactone) (PCL segment).

2. The polymer network according to claim 1, wherein the melting points of the two crystalline switching segments are in a range from 0° C. to 100° C.

3. The polymer network according to claim 1, wherein the first crystalline switching segment has an average molecular weight in a range from 500 to 50,000 g/mole.

4. The polymer network according to claim 1, wherein the second crystalline switching segment has an average molecular weight in a range from 500 to 50,000 g/mole.

5. The polymer network according to claim 1, wherein a fraction of the individual switching segments of the total weight of the crystalline switching segments in the polymer network is 20 to 80 wt. %.

6. A method for programming a polymer network with triple-shape-memory effect, wherein the polymer network comprises a first crystalline switching segment made of a star polymer based on poly(pentadecalactone) (PPDL segment) and a second crystalline switching segment made of a star polymer based on poly(ε-caprolactone) (PCL segment), the method comprises a step of:
   programming at least two different shapes of the polymer network with
   a) a one-step method;
   b) cold stretching; or
   c) a combination of heating and cold stretching.

7. The method according to claim 6, wherein programming is performed with the one-step method, wherein the polymer network is heated to $T_{high}$ above the two melting temperatures $T_{m,1}$ and $T_{m,2}$ of the crystalline switching segments ($T_{m,1} < T_{m,2}$), deformed, and then cooled to a temperature below $T_{m,1}$.

8. The method according to claim 6, wherein programming is performed by cold stretching, wherein the polymer network is deformed at a temperature $T_{low}$ below the two melting temperatures $T_{m,1}$ and $T_{m,2}$ of the crystalline switching segments ($T_{low} \ll T_{m,1} < T_{m,2}$).

9. The method according to claim 6, wherein the programming is performed with a combination of heating and cold stretching, wherein the polymer network is deformed at a temperature $T_{mid}$ which is located between the two melting temperatures $T_{m,1}$ and $T_{m,2}$ of the crystalline switching segments ($T_{m,1} < T_{mid} < T_{m,2}$).

10. A method for recovering a programmed polymer network having a triple-shape-memory effect according to claim 1, comprising the step: thermal treatment of the programmed polymer network in water as a heat carrier.

* * * * *